US010725619B1

(12) United States Patent
Binder et al.

(10) Patent No.: US 10,725,619 B1
(45) Date of Patent: Jul. 28, 2020

(54) BEHAVIOR-INFLUENCED CONTENT ACCESS/NAVIGATION MENUS

(71) Applicant: Layer3 TV, Inc., Denver, CO (US)

(72) Inventors: Jeffrey Binder, Denver, CO (US); David M. Fellows, Boston, MA (US); Vic Odryna, Boston, MA (US); Charles Hasek, IV, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 15/583,188

(22) Filed: May 1, 2017

Related U.S. Application Data

(60) Provisional application No. 62/454,365, filed on Feb. 3, 2017.

(51) Int. Cl.
*G06F 17/00* (2019.01)
*G06F 3/0482* (2013.01)
*H04N 21/482* (2011.01)
*H04N 21/466* (2011.01)
*H04N 21/45* (2011.01)
*G06F 16/74* (2019.01)
*G06F 16/2457* (2019.01)

(52) U.S. Cl.
CPC ...... *G06F 3/0482* (2013.01); *G06F 16/24578* (2019.01); *G06F 16/743* (2019.01); *H04N 21/4532* (2013.01); *H04N 21/4667* (2013.01); *H04N 21/4668* (2013.01); *H04N 21/4826* (2013.01)

(58) Field of Classification Search
CPC .......... G06F 17/30867; G06F 17/3053; G06F 3/0482
See application file for complete search history.

(56) References Cited

U.S. PATENT DOCUMENTS

| 7,917,859 B1* | 3/2011 | Singh ...................... G06F 9/451 715/763 |
| 8,335,997 B2* | 12/2012 | Chuang ............... H04M 1/2472 715/810 |
| 9,400,995 B2 | 7/2016 | Gu et al. |
| 2007/0174247 A1* | 7/2007 | Xu ........................... G06F 16/38 |
| 2009/0019394 A1* | 1/2009 | Sekimoto ........... H04N 5/44543 715/811 |
| 2009/0089288 A1* | 4/2009 | Petersen .................. H04W 4/02 |
| 2010/0031162 A1* | 2/2010 | Wiser ................. G06Q 30/0255 715/747 |

(Continued)

*Primary Examiner* — Scott T Baderman
*Assistant Examiner* — Barbara M Level
(74) *Attorney, Agent, or Firm* — Brownstein Hyatt Farber Schreck, LLP

(57) ABSTRACT

A content access device ranks content that is available to be accessed based at least on previous user content selection behavior information compared to a current situation. The content access device generates and presents a content access (or navigation) menu that indicates content selected based on the ranking. The menu may include a primary menu element that corresponds to and presents a highest ranked of the content, a secondary menu element that corresponds to and presents still images of a secondary ranked group of the content that are all smaller than the primary menu element, and a tertiary menu element that corresponds to and presents text descriptions of a tertiary ranked group of the content that are all smaller than the still images.

20 Claims, 8 Drawing Sheets

(56) References Cited

U.S. PATENT DOCUMENTS

| | | | |
|---|---|---|---|
| 2013/0179783 A1* | 7/2013 | Woods | H04N 21/42209 |
| | | | 715/716 |
| 2016/0014461 A1* | 1/2016 | Leech | H04N 21/4668 |
| | | | 725/14 |
| 2016/0196305 A1 | 7/2016 | Liu et al. | |

* cited by examiner

| CHANNEL | 8:00 | 8:30 | 9:00 |
|---|---|---|---|
| 101 | FOOTBALL PROGRAM X | FOOTBALL PROGRAM Y | BASEBALL |
| 83 | X NETWORK NEWS | X NETWORK MOVIE | X NETWORK MOVIE |
| 90 | POLICE DRAMA EPISODE 5 | POLICE DRAMA EPISODE 6 | POLICE DRAMA EPISODE 7 |
| 10 | GAME SHOW Y | GAME SHOW Z | PAID ADVERTISEMENT |
| 50 | SITCOM 3 | HOUSE SHOW | LATE NEWS |
| OnDemand | MOVIE W | MOVIE W | MOVIE W |
| DVR | MOVIE X | MOVIE X | MOVIE X |

FIG. 2

BEHAVIOR-INFLUENCED CONTENT ACCESS/NAVIGATION MENUS

CROSS-REFERENCE TO RELATED APPLICATIONS

This application claims the benefit under 35 U.S.C. § 119(e) of U.S. Provisional Patent Application No. 62/454,365, filed on Feb. 3, 2017, and entitled "BEHAVIOR-INFLUENCED CONTENT ACCESS/NAVIGATION MENUS," the contents of which are incorporated by reference as if fully disclosed.

FIELD

The described embodiments relate generally to content access devices. More particularly, the present embodiments relate to facilitating content navigation in a way that is tailored to a user's previous behavior.

BACKGROUND

Many different electronic devices may function as content access devices by facilitating user access to various content assets. These content access devices may include computing devices, smart phones, tablet computing devices, and so on. Content access devices may present (such as via a display, speaker, and so on) and/or otherwise access content stored by the content access device, received or otherwise accessible via various communication media, and so on.

For example, a content access device may be a set top box, digital video recorder, network digital video recorder, and/or other device that allows a user to access content provided by a content delivery network and/or other networks, such as the Internet or one or more social media networks. Examples of a content delivery network include a satellite or cable television, movie, and/or other content provider.

Content access devices may provide access to a great deal of content of a variety of different types from a number of different sources. Content access devices may provide content access/navigation menus and/or other user interfaces that allow users to find the content they wish to access amidst all of the accessible content.

SUMMARY

The present disclosure relates to user-behaviors influenced content access/navigation menus. A content access device ranks content that is available to be accessed based at least on previous user content selection behavior information compared to a current situation. The content access device generates and presents a content access (or navigation) menu that indicates content selected based on the ranking.

In various embodiments, a content access device includes a non-transitory storage medium storing instructions and a processing unit. The processing unit executes the instructions to present a content navigation menu by ranking available content for a user based on information regarding previous user behavior compared to a current situation of the content access device, presenting a primary menu element corresponding to a highest of the ranked available content, presenting a secondary menu element corresponding to a secondary ranked group of the ranked available content, and presenting a tertiary menu element corresponding to a tertiary ranked group of the ranked available content are presented in the tertiary menu element.

In some examples, secondary menu element areas for the secondary ranked group of the ranked available content are each smaller than an area of the primary menu element for the highest of the ranked available content. In some instances of such examples, tertiary menu element areas for the tertiary ranked group of the ranked available content are each smaller than each of the secondary menu element areas.

In numerous examples, the highest of the ranked available content is presented in the primary menu element. In various examples, still images from the secondary ranked group of the ranked available content are presented in the secondary menu element. In some examples, text descriptions of the tertiary ranked group of the ranked available content.

In various examples, the processing unit switches from the content navigation menu to present selected content in response to a content selection. In some cases of such examples, in response to a selection to return from the selected content to the content navigation menu, the processing unit provides a modified content navigation menu. In such a modified content navigation menu, the primary menu element may correspond to the selected content and/or a secondary menu element area corresponding to the highest of the ranked available content may replace a previous secondary menu element area.

In some embodiments, a method for facilitating content navigation using a content access device includes recording user behavior information regarding selection by a user of content using a content access device and a situation of the content access device at the time of access, determining to present a content access menu using the content access device, ranking available content utilizing the content access device based on the recorded user behavior information compared to a current situation of the content access device, and presenting the content access menu indicating content selected based on the ranking utilizing the content access device. The current situation of the content access device may include at least one of a current time period, a date, a location, a time of year, and/or so on.

In various examples, ranking the available content based on the recorded user behavior information compared to the current situation of the content access device includes ranking an instance of content lower if the instance of content is relevant to a particular time period that is not associated with a current time period. In some examples, the recorded user behavior information indicates an instance of content the user is most likely to access in context of the current situation of the content access device.

In numerous examples, the method further includes presenting an additional content access menu indicating content selected based on the ranking utilizing the content access device. The additional content access menu may have a different arrangement than the content access menu. In other examples, the method further includes switching the content access device to a profile associated with an additional user, re-ranking the available content utilizing the content access device based on recorded user behavior information of the additional user compared to the current situation of the content access device, and presenting an additional content access menu based on the re-ranking utilizing the content access device.

In some examples, presenting the content access menu is performed when the content access device begins operation. In other examples, presenting the content access menu is performed in response to user input.

In numerous embodiments, a content access device includes a non-transitory storage medium storing instructions and a processing unit. The processing unit executes the instructions to determine to present a content access menu, rank available content based on recorded user behavior information regarding selection of content by a user and a situation at the time of access compared to a current situation of the content access device, and present the content access menu indicating content selected based on the ranking.

In some examples, a first portion of the content access menu corresponding to a higher ranked content is larger than a second portion of the content access menu corresponding to a lower ranked content. In some cases of such examples, a third portion of the content access menu corresponding to an instance of content ranked lower than the lower ranked content is smaller than the second portion of the content access menu.

In various examples, the content access menu comprises a list of content descriptions. In numerous examples, the processing unit presents an instance of content in response to a selection from the content access menu. In some examples, the recorded user behavior information includes data regarding content selected by the user using a different content access device.

BRIEF DESCRIPTION OF THE DRAWINGS

The disclosure will be readily understood by the following detailed description in conjunction with the accompanying drawings, wherein like reference numerals designate like structural elements.

FIG. 2 depicts another example of a content navigation menu.

DETAILED DESCRIPTION

Figure 1A:
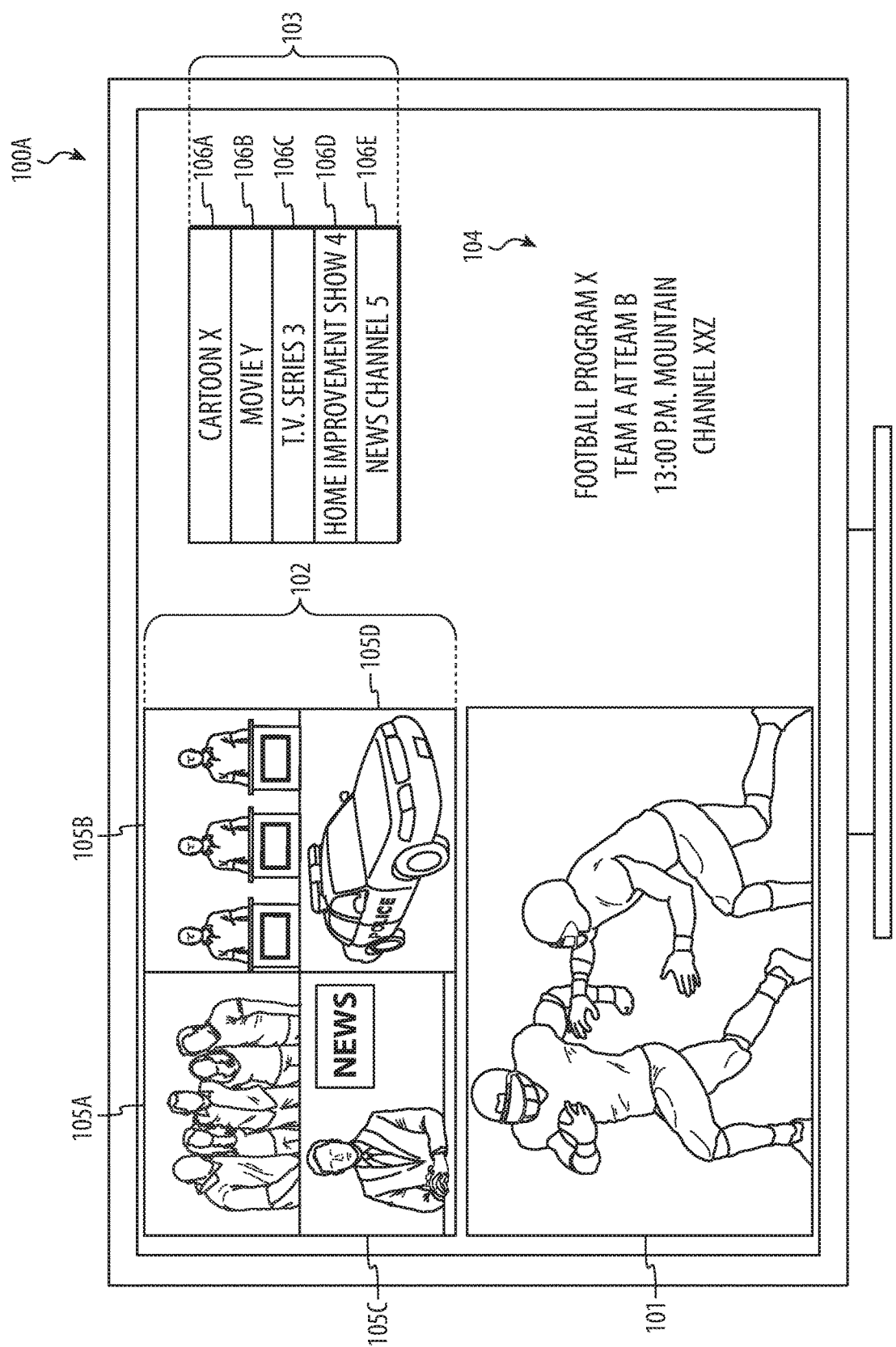
FIG. 1A depicts an example content navigation menu that may be presented by a content access device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The following disclosure relates to content access/navigation menus that are influenced by previous user-behaviors. Content that is available to be accessed using a content access device is ranked based at least on recorded or other previous user behavior information regarding content selection as compared to a current situation (such as the current situation of the content access device). A content navigation (or access) menu is generated and presented that indicates content selected based on the ranking. The ranking, generation, and/or presentation may be performed upon a determination to present the content navigation menu, such as when the content access device first operates, upon receipt of a user request for such a menu, and so on.

In this way, content (such as linear content like broadcast content, streaming content, and so on or non-linear content like on demand content, recorded content, and so on) a user has an affinity for may be included and/or otherwise indicated or represented on the content navigation menu. This may be determinative rather than predictive as the ranking of content is based on the user's previous selections. The current situation and the previous situation may be compared to more granularly determine the user's affinities, such as selections and/or rankings at particular times, during particular seasons or times of year, from particular locations, using particular content access devices, from various different profiles, or the like. For example, news may be ranked highest and selected at 5:00 PM if 80% of the time the user selects news when accessing content at 5:00 PM.

In some implementations, the content navigation menu may be a list of content descriptions. For example, a list of content descriptions may be organized in a grid by channel and/or other source and time. Such a list is typically referred to as a "channel guide."

In other implementations, the content navigation menu may include different menu elements of differing sizes and/or other prominence corresponding to different ranked instances or groups of content. For example, the content navigation menu may include at least a first or primary menu element, a second or secondary menu element, and a third or tertiary menu element. The primary menu element may correspond to a highest of the ranked available content and may actually present the highest of the ranked available content. The secondary menu element may correspond to a secondary ranked group of the ranked available content and may present still images or other graphics related to the secondary ranked group that may all be smaller or otherwise less prominent than the primary menu element. The tertiary menu element may correspond to a tertiary ranked group of the ranked available content and may present text descriptions of the tertiary ranked group that may all be smaller or otherwise less prominent than the still images.

These and other embodiments are discussed below with reference to FIGS. 1A-6. However, those skilled in the art will readily appreciate that the detailed description given herein with respect to these Figures is for explanatory purposes only and should not be construed as limiting.

FIG. 1A depicts an example content navigation (or access) menu 100A that may be presented by a content access device. The content access device may rank available content (such as linear content like broadcast content, streaming content, and so on or non-linear content like on demand content, recorded content, and so on) for a user based on information regarding previous user behavior compared to a current situation, such as the current situation of the content access device. The content access device may then select content based on the ranking and generate and present the content navigation menu 100A.

The content navigation menu 100A may include at least a primary menu element 101, a secondary menu element 102, and a tertiary menu element 103. The primary menu element 101 may correspond to a highest ranked of the ranked available content. The secondary menu element 102 may correspond to a secondary ranked group of the ranked available content with individual secondary menu element areas 105A-105D corresponding to respective ones of the secondary ranked group. Similarly, the tertiary menu element 103 may correspond to a tertiary ranked group of the ranked available content with individual tertiary menu element areas 106A-106E corresponding to respective ones of the tertiary ranked group. The tertiary menu element areas 106A-106E may all be smaller or otherwise less prominent than the secondary menu element areas 105A-105D, which may in turn be smaller or otherwise less prominent than the primary menu element 101. In this way, the highest ranked content is depicted or otherwise represented most prominently in the content navigation menu 100A, with selected secondary and tertiary groups of content depicted or otherwise represented increasingly less prominently. This may allow the user to access a variety of content for which the user has an affinity while focusing most heavily on the content for which the user has the most affinity.

As shown, in this example the content navigation menu 100A also includes an informational element 104. The informational element 104 may include text or other data regarding the highest ranked of the ranked available content corresponding to the primary menu element 101. However, in other examples, various other information may be represented in the informational element 104.

In various examples, the highest ranked of the ranked available content may actually be presented in the primary menu element 101. By contrast, the secondary menu element areas 105A-105D may include still images or other graphic representations related to the secondary ranked group and the tertiary menu element areas 106A-106E may include text descriptions or other similar information regarding the tertiary ranked group. In this way, the user may be able to access the highest ranked of the ranked available content by default while still being presented the ability to switch to one of the lower ranked instances of content. This arrangement may also indicate selected ranked content in decreasing order of prominence corresponding to decreasing rank.

In this way, content a user has an affinity for may be included and/or otherwise indicated or represented on the content navigation menu 100A. This may be determinative rather than predictive as the ranking of content is based on the recorded previous user behavior, or the user's previous selections. For example, the user may access a music television channel 70% of the time they access content. As such, the music television channel may be ranked as the highest of the ranked available content. Thus, the primary menu element 101 may indicate an instance of content the user is most likely to access.

The current situation (such as the current situation of the content access device) and the situation when the previous user behavior was recorded may be compared to more granularly determine the user's affinities, such as selections and/or rankings at particular times, during particular seasons or times of year, from particular locations, using particular content access devices, from various different profiles, or the like. Thus, the primary menu element 101 may indicate an instance of content the user is most likely to access in context of the current situation.

In some implementations, ranking content may be based on comparing recorded or previous user behavior and/or the situation when such was recorded to a current situation of the content access device. The current situation may include a current time period, a date, a location, a time of year, the content access device being used, a profile currently being used, and so on. For example, a user may watch football 80% of the evening hours, but only during football season. This may be because previous user data may be relevant to a particular time period and an instance of content may be ranked higher if the current time period is that particular time period and ranked lower if relevant to a particular time period that is not the current time period. Outside of football season, the user may watch a particular television network 70% of the evening hours. As such, a football program may be selected as the highest of the ranked available content and indicated in the primary menu element 101 during football season whereas the particular television network may be selected outside of football season.

In various implementations, any number of different factors may be evaluated when comparing previous user behavior to a current situation to rank content. Any factor that may indicate how a user will behave with respect to content may be taken into account.

By way of example, previous user behavior user may indicate that the user tends to watch R rated movies only in the user's bedroom and family comedies in the user's living room. As such, family comedies may be indicated in the content navigation menu 100A when presented on a content access device in the user's living room whereas R rated movies may be indicated in the content navigation menu 100A when presented by a content access device in the user's bedroom.

In another example, the user may typically view local news in the morning and national news in the afternoon. If the user accesses the content navigation menu 100A in the morning, local news content from the news channel may be indicated in the content navigation menu 100A. However, if the user accesses the content navigation menu 100A in the evening, national news content from the news channel may be indicated in the content navigation menu 100A.

In various implementations, previous user behavior may be dependent on a context such as time. For example, previous user behavior may show that a user always watches local XYZ news at 7:00 AM. When it is 7:00 AM, the content navigation menu 100A may therefore serve up local XYZ news in a manner that makes it convenient for the user to choose to watch it.

However, even when context includes a time of day, time may not be the sole consideration. Context may be more than only the time of day. Context may also depend on the location in which content is being accessed. For example, content a user usually accesses in their family room may be different from what they usually access in their home theater, kitchen, bedroom, and so on. Many other factors beyond a current time and/or location might be taken into account in determining which content to provide easy access to. For example, weather may be a consideration. If there is an approaching storm, one of the higher ranked suggestions may be a weather channel.

Another example may be a sporting event to a sporting enthusiast. If a sporting enthusiast user turns on the content access device during March Madness and a National Collegiate Athletic Association game is currently airing, the game may be ranked highly. Similar actions may be performed in relation to when World Cup soccer is happening.

Yet another example may be a breaking news item. If the user is an avid news follower, a news program may be highly ranked when a breaking news item has occurred.

Occurrences such as storms, breaking news items, and other events that may influence context may be determined in a variety of ways. For example, occurrences may be detected from social media feeds, such as the user's social media feed, national and/or other trending topics lists, and so on; various social media posts; manual entry by one or more content providers; and so on.

Figure 1B:
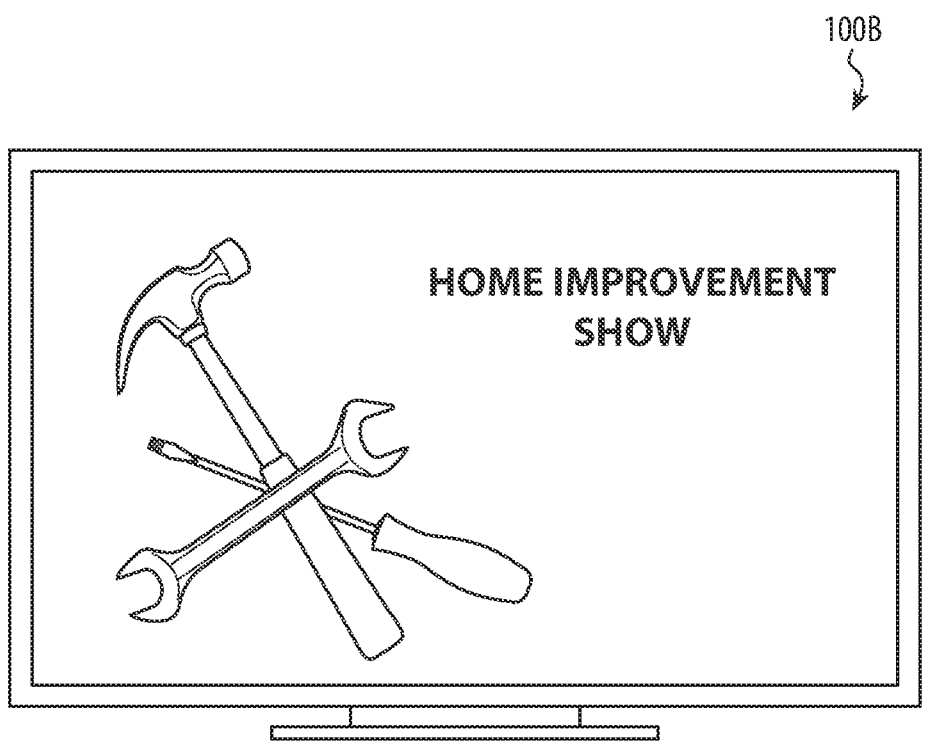
FIG. 1B depicts content presented by a content access device after a selection is received via the content navigation menu of FIG. 1A.

In various examples, the content navigation menu 100A may be configured as described above on first access and may be modifiable as the user interacts with it and/or accesses content. For example, the user may be able to select one or more of the primary menu element 101, one of the secondary menu element areas 105A-105D, one of the tertiary menu element areas 106A-106E, and/or otherwise select an instance of content to access. In response, the content access device may switch from the content navigation menu 100A to the selected instance of content. For example, the display 100B in FIG. 1B illustrates presentation of an instance of content based on selection of the tertiary menu element area 106D.

Subsequently, the user may provide input to return to the content navigation menu 100A. Upon return, the content access device may present the content navigation menu 100C of FIG. 1C, which may be modified and/or otherwise updated for the content accessed in the display 100B in FIG. 1B.

For example, the instance of content previously corresponding to the tertiary menu element area 106D in FIG. 1A now corresponds to the primary menu element 101. Further, the instance of content previously corresponding to the primary menu element 101 in FIG. 1A now corresponds to the secondary menu element area 105A. In other words, the secondary menu element area 105A corresponding to the highest of the ranked available content in FIG. 1A replaced a previous secondary menu element area 105A in FIG. 1C. Additionally, the instance of content previously corresponding to the secondary menu element area 105A in FIG. 1A now corresponds to the tertiary menu element area 106D.

Thus, the content navigation menu 100C may be modified from the original rankings based on a user's current interaction with content and/or the content access device. This may allow current user behavior patterns to override previous user behavior information. Such overriding may be temporary, unless frequent enough to change rankings by changing the recorded previous user behavior information for later ranking.

Figure 1C:
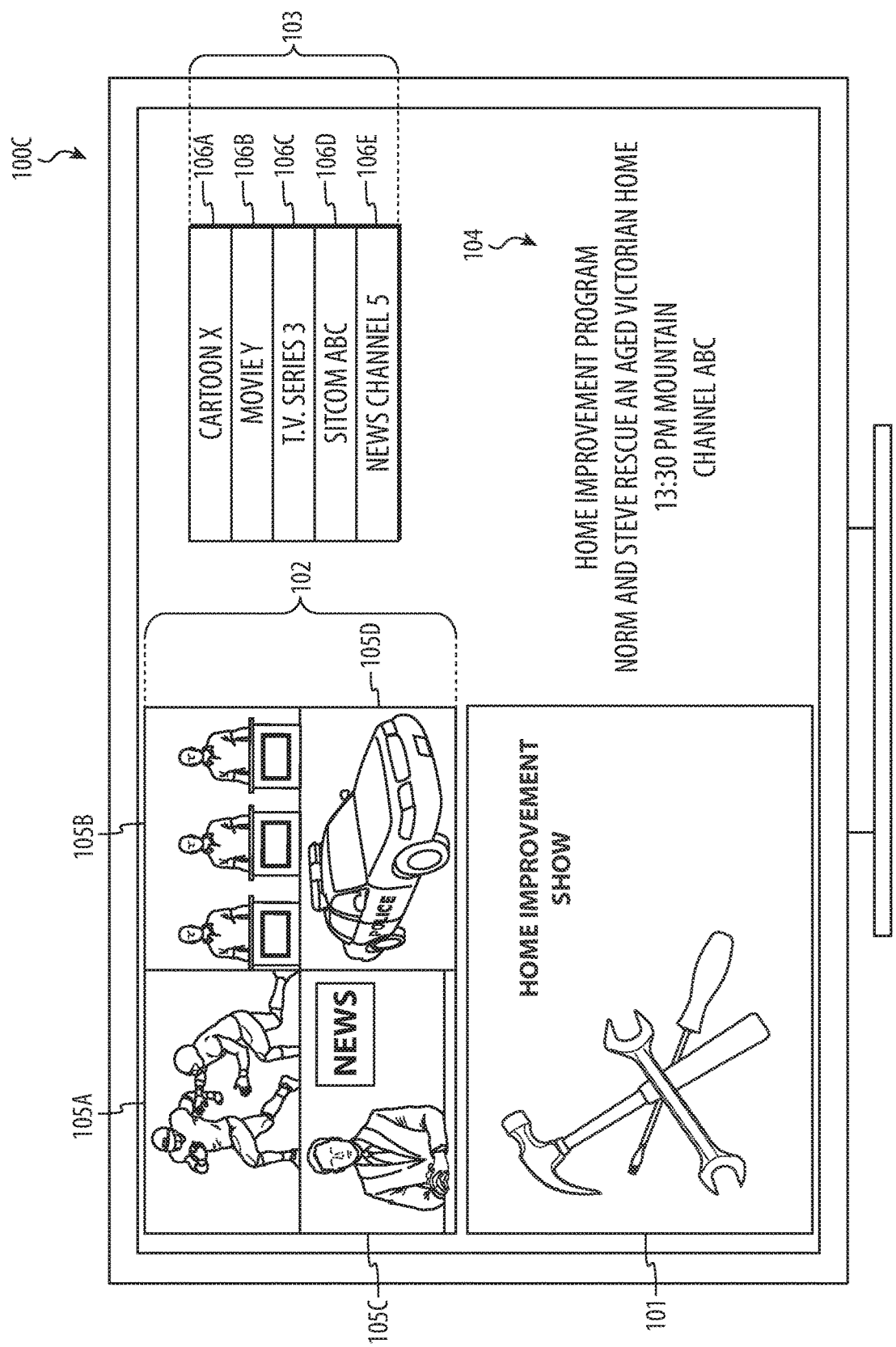
FIG. 1C depicts the content navigation menu of FIG. 1A modified upon receipt of a selection to present the content navigation menu from the content presentation of FIG. 1B.

Although FIGS. 1A-1C describe a user navigating a particular path through the content navigation menus 100A-100C, it is understood that this is an example. In various implementations, a user may be able to return to various previously accessed content navigation menus 100A-100C without proceeding in the particular order described above. Various configurations are possible and contemplated.

Returning to FIG. 1A, the above describes access and ranking in the context of a user. In various implementations, access and ranking may be performed in the context of one or more profiles, which may be used by one or more different users.

Further, in various implementations, the content access device may be switched between various users. If the content access device presents the content navigation menu 100A for a first profile associated with a first user and switches to a profile associated with an additional user, the content access device may re-rank the available content. The content access device may re-rank based on user behavior information of the additional user compared to the current situation. The content access device may then generate and present and additional content access menu based on the re-ranking.

In some examples, the content navigation menu 100A may be a "home menu." Such a home menu may be presented when the content access device first powers on or begins operation, when the user switches away from accessed content, and so on.

In various examples, behavior of the user may be monitored and recorded to generate the recorded previous user behavior information. Information about the situation at the time the previous user behavior information is recorded may also be monitored and recorded so as to be comparable against a current situation later. The user behavior information may be monitored, recorded, and stored by the content access device and/or one or more other electronic devices with which the content access device communicates (such as the headend of a content provider accessible via the content access device).

In some examples, information about behaviors of a general population of users other than the user may be received (as well as monitored user behavior data transmitted to be used elsewhere as part of general user behavior information). This may be received to use as a template or default user profile, which may then be modified by actual monitored user behavior. Such general user behavior information may be periodically received and used to update the user behavior data.

The above describes ranking available content and presenting a content navigation menu 100A based thereon. However, it is understood that this is an example. In some implementations, ranking based on information regarding previous user behavior may be used in various contexts.

For example, a digital video recorder ("DVR") listing may be organized based on such rankings. Such a DVR listing may be ranked based on time of day, week, and so on. The DVR listing may also be based on other factors, such as recent user behavior, rising popularity of content, recent DVR accesses, and so on.

By way of another example, a content access device may perform various actions automatically when a show flagged by such rankings is upcoming. In some implementations, the content access device may pop up a message about the show. In other implementations, the show may be automatically recorded.

By way of still another example, a user may be able to control rankings, presentation, and/or other aspects of the above. For example, a user may be able to specify that mature content is not automatically presented.

Ranking based on previous user behavior may include decay and/or time boxing. Decay and/or time boxing may involve discarding previous user behavior for purposes of comparison if it is more than a certain amount of time old, such as one month or one year, if it is crowded out by newly observed data, and so on. Users may change over time and such decay and/or time boxing may allow recognition of user changes.

On the other hand, the concept of seasonality may also be applied to previous user behavior to override only time-based aging. For example, a user's behavior related to a current Christmas, basketball season, and so on may be determined based on their behavior during a previous similar time period. Many television shows are seasonal, at least in part due to television producer understanding that viewing habits are often seasonal. As such, decay and/or time boxing rules applied to stored information about previous user behavior may be modified based on seasonality to avoid losing observed information about how users behave during different seasons.

Thus, a strong decay may be applied, overlaid with seasonality. In other words, data may be removed from consideration over time, but may be brought back from previous time periods to account for seasonality.

The reverse of decay may also be used. For example, newer data may be accorded more weight, particularly when acted upon quickly. If a user accesses the next episode of a show within seconds after that show is recorded, the previous user behavior may be interpreted to determine that the user has a very strong interest in that show. As such, actions such as sending the user text or other message as a notification a few hours before the next episode airs, playing a trailer in the content navigation menu 100A, and/or the like may be performed.

The above describes the content navigation menu 100A as presented by a content access device. The content access device may be any kind of electronic device (such as a set top box, digital video recorder or player, a television, a smart phone, a laptop computing device, a cellular telephone, a digital media player, a wearable device, a tablet computing device, a mobile computing device, a desktop computing device, or the like) that is operable to access and/or present content. In some implementations, the content access device may be multiple electronic devices working together, such as in a cloud computing or other arrangement. An example of a content access device is elaborated with respect to FIG. 6 below.

Although the above describes actually presenting the highest ranked of the ranked available content in the primary menu element 101, still images or other graphic representations related to the secondary ranked group in the secondary menu element areas 105A-105D, and so on, it is understood that these are examples. In some implementations, presentation of content and/or still images related to content without specific user request may be objectionable. As such, one or more user-defined and/or default rules may be evaluated that may override such presentation.

For example, the highest ranked of the ranked available content may include graphic violence. A rule may be evaluated that indicates that graphic violence should not automatically be presented if the content access device is a living room content access device, but should be automatically presented if the content access device is a parental bedroom content access device. As such, when the highest ranked of the ranked available content for the living room content access device includes graphic violence, a replacement may be presented instead of the highest ranked of the ranked available content. This may be different content, a censored version of the highest ranked of the ranked available content, a message indicating that the highest ranked of the ranked available content is not being displayed, and/or any other such replacement content. However, when the highest ranked of the ranked available content for the parental bedroom content access device includes graphic violence, the highest ranked of the ranked available content may actually be presented.

Although the above illustrates and describes a particular content navigation menu 100A, various of the techniques discussed herein may be used to generate and/or present other content navigation or access menus that may have different arrangements than those illustrated and described above. In various implementations, a content access device may be operable to generate and present multiple different content navigation or access menus or other interfaces, such as where the content access device presents the content navigation menu 100A as a home menu and presents other content guides in other contexts.

For example, FIG. 2 depicts another example of a content navigation (or access) menu 200. The content navigation menu 200 may be arranged in a grid like a typical program guide. The grid may include rows corresponding to channels or other content sources (which may include linear content such as broadcast content, streaming content, and the like and/or non-linear content such as on demand, recorded, and the like) and columns corresponding to various times.

Compared with the content navigation menu 100A of FIG. 1A, rather than including tertiary menu element areas 106A-106E representing a tertiary ranked group of content, secondary menu element areas 105A-105D representing a secondary ranked group content that are larger than the tertiary menu element areas 106A-106E, and a primary menu element 101 representing a highest ranked content that is larger than the secondary menu element areas 105A-105D, the content navigation menu 200 may include a list of the highest ranked content, such as represented by elements 201, 202, 203. The elements 201, 202, 203 may all have the same size, prominence, and so on. Alternatively, the elements 201, 202, 203 may have different sizes and/or prominences, but such sizes or prominences may not be related to the rank of the respective associated content.

As illustrated and described above, the content navigation menu 200 may include times. In the cases of linear content (such as broadcast or streaming content), these may be the times that the associated instances of content are broadcast or streamed. However, in the cases of on demand, recorded, or other non-linear content, these times may be any time the associated content may be accessed. Alternatively, the times may be entirely unrelated to non-linear content and the non-linear content may be included in the columns to be able to be presented in the same content navigation menu 200 as linear content.

Additionally, though the content navigation menu 200 is illustrated and described as rows of channels or other sources and columns of times, it is understood that this is an example. In various implementations, various arrangements of a grid or other structure may be used without departing from the scope of the present disclosure.

Figure 3:
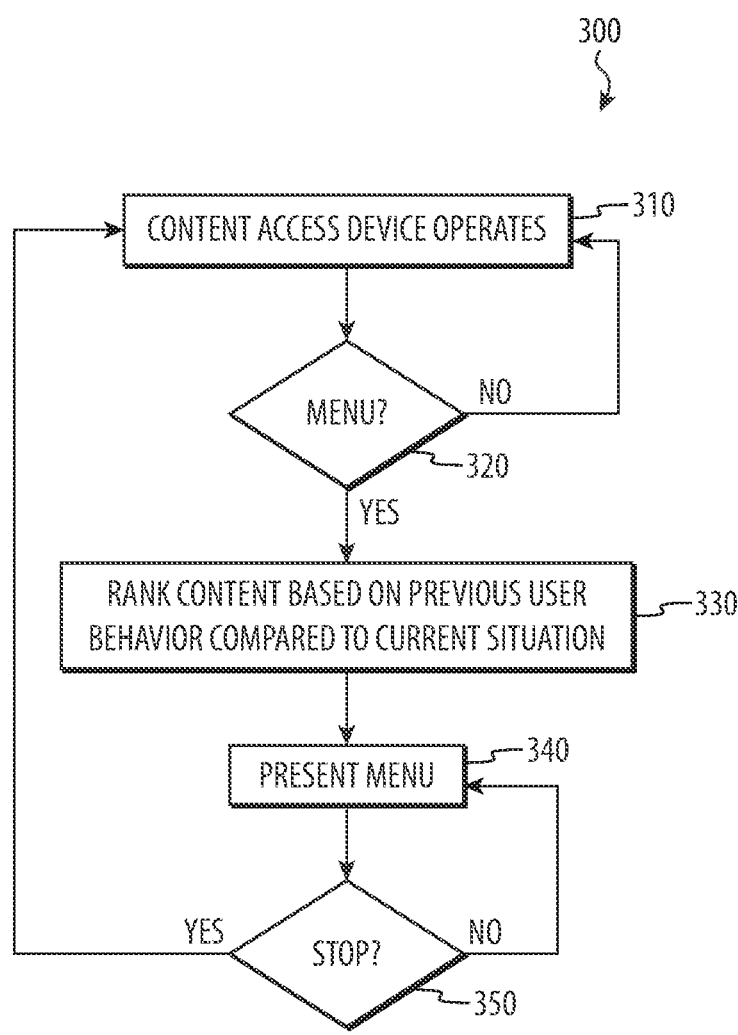
FIG. 3 presents a first example method for facilitating content navigation using a content access device. The method may present one or more of the menus of FIGS. 1A-2.

FIG. 3 presents a first example method 300 for facilitating content navigation using a content access device. The method 300 may present one or more of the menus of FIGS. 1A-2.

At 310, a content access device operates. The flow then proceeds to 320 where the content access device determines whether or not to present a menu or other interface. The content access device may make such a determination based on the fact it has just powered on and/or begun operation, in response to user input, and/or other factors. The menu may be a content navigation menu, a content access menu, and so on. If so, the flow proceeds to 330. Otherwise, the flow returns to 310 where the content device continues to operate.

At 330, after the content access device determines to present the menu, the content access device ranks available content based on previous user behavior compared to the current situation. In some implementations, the previous user behavior may be previous user behavior using the content access device. In other implementations, the previous user behavior may be previous user behavior using one or more electronic devices that may or may not include the content access device. The flow then proceeds to 340 where the content access device presents a menu generated including instances of content selected based on the ranking.

Next, the flow proceeds to 350 where the content access device determines whether or not to stop presenting the menu. The content access device may determine to stop presenting the menu based on receipt of a selection of content to access and/or other user input. If so, the flow returns to 310 where the content access device continues to operate. Otherwise, the flow returns to 340 where the content access device continues presenting the menu.

Although the example method 300 is illustrated and described as including particular operations performed in a particular order, it is understood that this is an example. In various implementations, various orders of the same, similar, and/or different operations may be performed without departing from the scope of the present disclosure.

For example, the example method 300 illustrates and describes ranking each time the menu is presented. However, in various implementations, the content access device may present a menu based on a ranking previously performed when presenting another menu.

Figure 4:
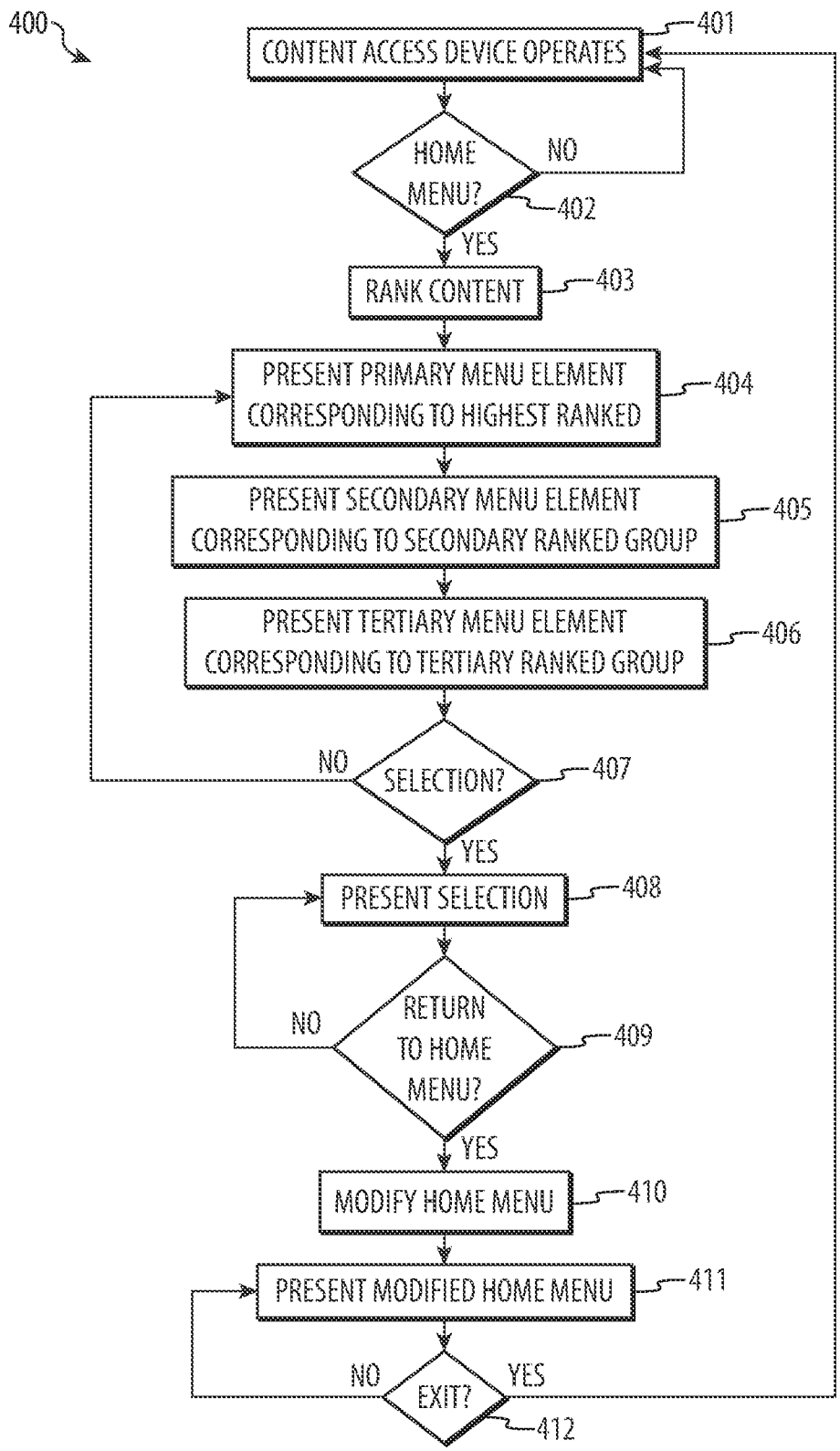
FIG. 4 presents a second example method for facilitating content navigation using a content access device. The method may present one or more of the menus of FIGS. 1A-2.

FIG. 4 presents a second example method 400 for facilitating content navigation using a content access device. The method 400 may present one or more of the menus of FIGS. 1A-2.

At 401, a content access device operates. The flow then proceeds to 402 where the content access device determines whether or not to present a home menu or other interface. If so, the flow proceeds to 403. Otherwise, the flow returns to 401 where the content access device continues to operate.

At 403, after the content access device determines to present the home menu, the content access device ranks available content based on previous user behavior compared to the current situation. The flow then proceeds to 404 where the content access device presents a primary menu element corresponding to a highest ranked of the available content. Next, the flow proceeds to 405 where the content access device presents a secondary menu element corresponding to a secondary ranked group of the available content. Areas of the secondary menu element corresponding to each of the secondary ranked group may all be smaller and/or otherwise less prominent than the primary menu element. Then, the flow proceeds to 406 where the content access device presents a tertiary menu element corresponding to a tertiary ranked group of the available content. Areas of the tertiary menu element corresponding to each of the tertiary ranked group may all be smaller and/or otherwise less prominent than all of the areas of the secondary menu element that each correspond to one of the secondary ranked group.

Next, the flow proceeds to 407 where the content access device determines whether or not a content access selection is received. If so, the flow proceeds to 408. Otherwise, the flow returns to 404 where the content access device continues presenting the home menu.

At 408, the content access device presents the selected content. The flow then proceeds to 409 where the content access device determines whether or not to return to the home menu. If so, the flow proceeds to 410. Otherwise, the flow returns to 408 where the content access device continues presenting the selected content.

At 410, after the content access device determines to return to the home menu, the content access device modifies the home menu. In the modified home menu, a primary menu element may correspond to the selected content in 407 and a secondary menu element area that corresponds to the highest of the ranked available content may replace a previous secondary menu element area. The flow proceeds to 411 where the modified home menu is presented.

Next, the flow proceeds to 412 where the content access device determines whether or not to exit the modified home menu. If not, the flow returns to 411 where the content access device continues presenting the modified home menu. Otherwise, the flow returns to 401 where the content access device continues to operate.

Although the example method 400 is illustrated and described as including particular operations performed in a particular order, it is understood that this is an example. In various implementations, various orders of the same, similar, and/or different operations may be performed without departing from the scope of the present disclosure.

For example, the example method 400 is illustrated and described as modifying the home menu when returning after presenting selected content. However, in various implementations, the home menu may not be modified when returning after presenting selected content. In some implementations, content may be ranked and the home menu presented fresh each time the home menu is determined to be presented. Various configurations are possible and contemplated.

Figure 5:
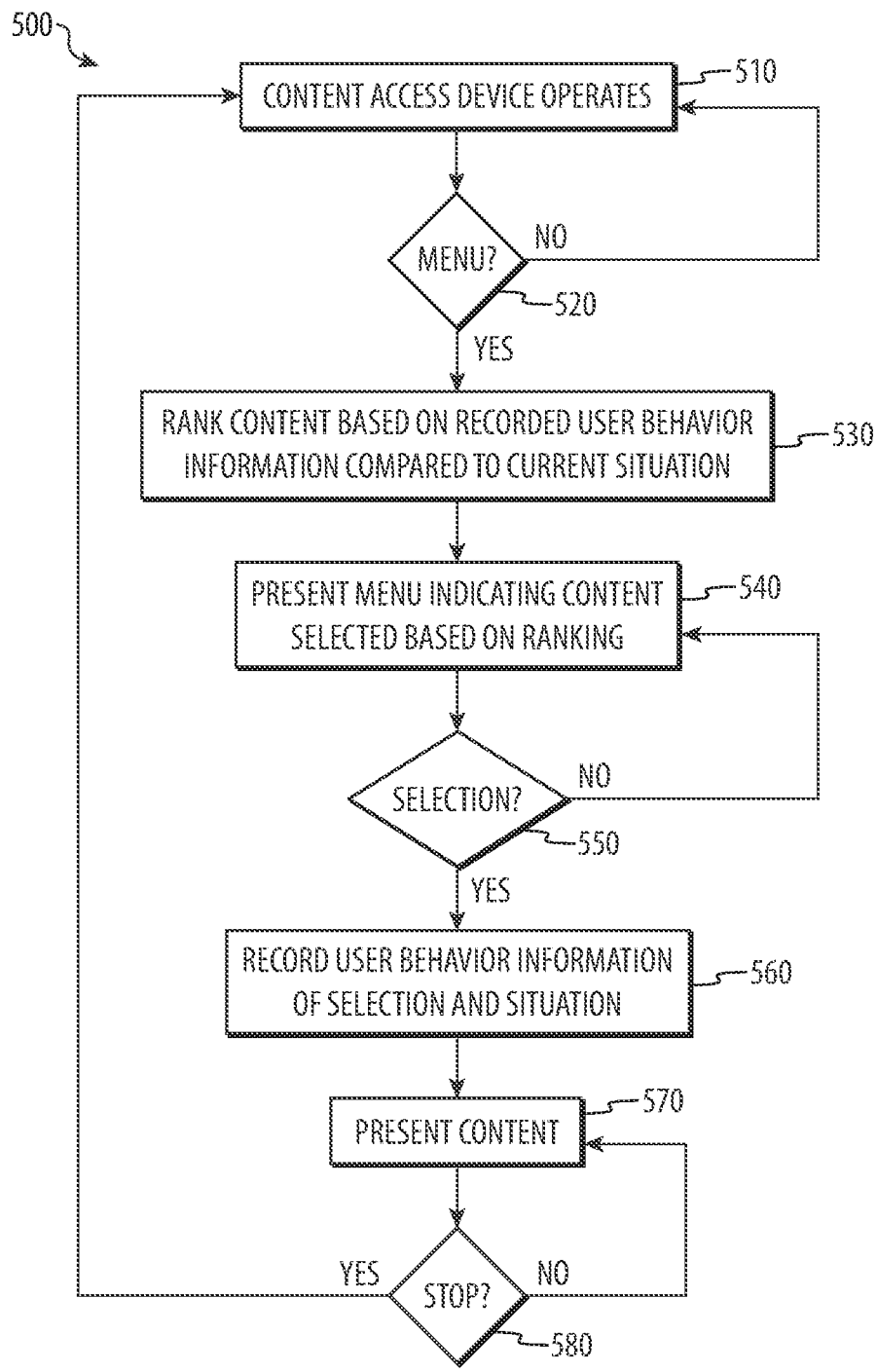
FIG. 5 presents a third example method for facilitating content navigation using a content access device. The method may present one or more of the menus of FIGS. 1A-2.

FIG. 5 presents a third example method 500 for facilitating content navigation using a content access device. The method 500 may present one or more of the menus of FIGS. 1A-2.

At 510, a content access device operates. The flow then proceeds to 520 where the content access device determines whether or not to present a menu or other interface. If so, the flow proceeds to 530. Otherwise, the flow returns to 510 where the content access device continues to operate.

At 530, after the content access device determines to present the menu, the content access device ranks available content based on previous user behavior compared to the current situation. The flow then proceeds to 540 where the content access device presents a menu indicating content based on the ranking.

Next, the flow proceeds to 550 where the content access device determines whether or not a content selection is received. If so, the flow proceeds to 560. Otherwise, the flow returns to 540 where the content access device continues presenting the menu.

At 560, after the content access device determines that a content selection is received, the content access device records user behavior information of the selection and the situation. The situation may include the time period of the selection, the date of the selection, the location of the selection, the time of year of the selection and/or any other factor of the situation related to the selection. The content access device may record the user behavior information in a non-transitory storage medium of the content access device and/or one or more other electronic devices.

The flow may then proceed to 570 where the content access device presents the selected content. Next, the flow proceeds to 580 where the content access device determines whether or not to stop presenting the selected content. If so, the flow returns to 510 where the content access device continues to operate. Otherwise, the flow returns to 570 where the content access device continues presenting the selected content.

Although the example method 500 is illustrated and described as including particular operations performed in a particular order, it is understood that this is an example. In various implementations, various orders of the same, similar, and/or different operations may be performed without departing from the scope of the present disclosure.

For example, the example method 500 is illustrated and described as recording user behavior upon receipt of a selection and then presenting selected content. However, in various implementations, these operations may not be performed in this precise, linear order and may be performed in different orders, simultaneously and/or substantially simultaneously, and so on. Further, recording of user behavior may be performed at a variety of different times to record a variety of different behaviors and/or characteristics of the situation in which the behaviors are detected without departing from the scope of the present disclosure.

Figure 6:
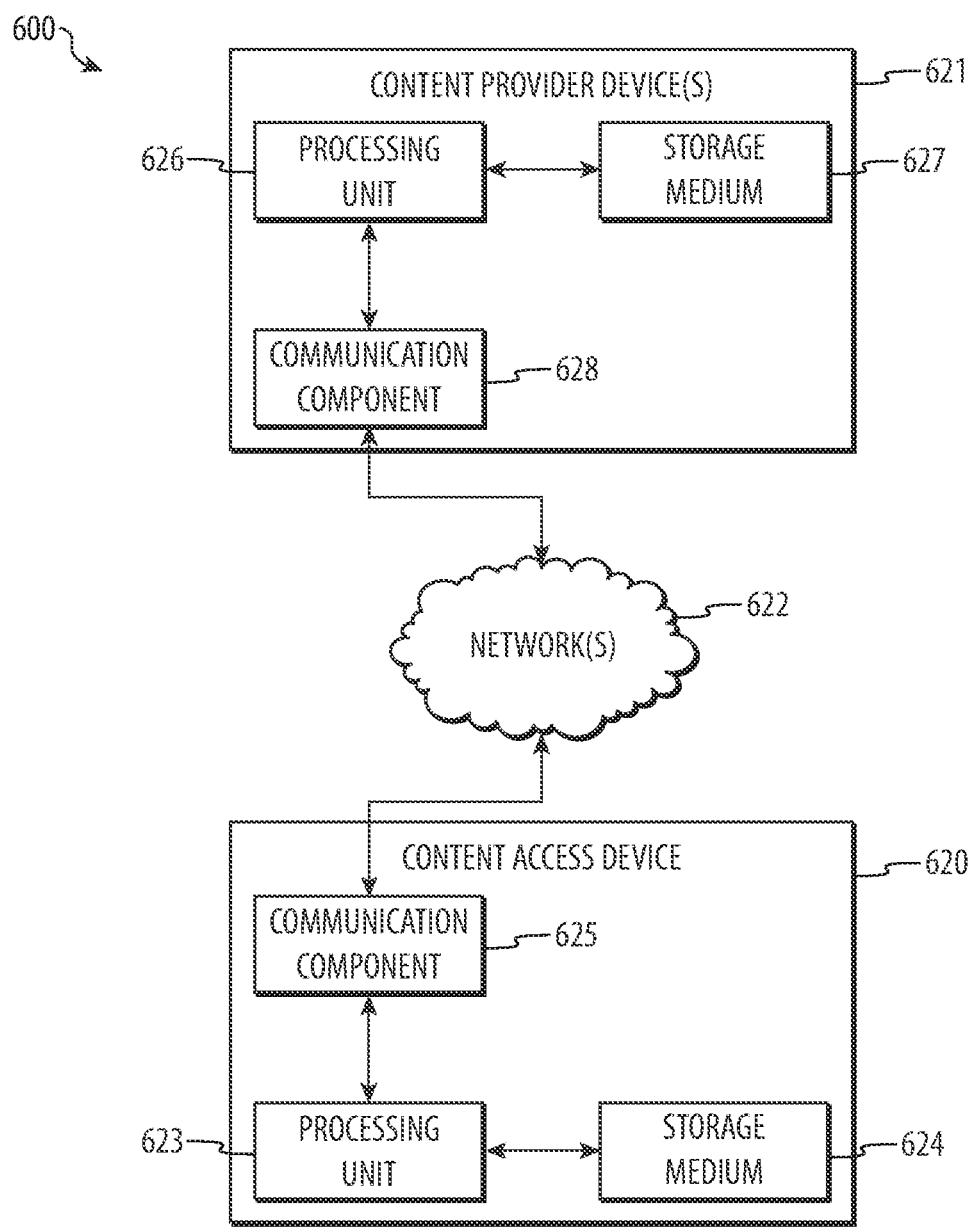
FIG. 6 depicts a content access system. The content access system may perform one or more of the methods of FIGS. 3-5 and/or present one or more of the menus of FIGS. 1A-2.

FIG. 6 depicts a content access system 600. The content access system 600 may perform one or more of the methods 300-500 of FIGS. 3-5 and/or present one or more of the menus of FIGS. 1A-2.

The content access system 600 may include a content access device 620. The content access device 620 may be any kind of electronic device capable of displaying and/or otherwise presenting stored and/or received content. Examples of such electronic devices include, but are not limited to, set top boxes, cable boxes, digital video recorders, network digital video recorders, digital media players, desktop computing devices, laptop computing devices, digital video disc players, video cassette recorders, tablet computing devices, smart phones, mobile computing devices, cellular telephones, wearable devices, and so on.

The content access device 620 may include one or more processing units 623, one or more non-transitory storage media 624 (which may take the form of, but is not limited to, a magnetic storage medium; optical storage medium; magneto-optical storage medium; read only memory; random access memory; erasable programmable memory; flash memory; and so on), one or more communication components 625, and/or other components such as user interface components and so on. The processing unit 623 may execute instructions stored in the storage medium 624 to perform various functions, such as to receive and/or store content from one or more content provider devices 621 via one or more communication networks 622, present and/or otherwise access content, prevent one or more content navigation or access menus and/or other interfaces, and so on.

Similarly, the content provider device 621 may include one or more processing units 626, storage media 627, communication components 628, and so on. In various implementations, the processing unit 626 may be operable to perform one or more functions discussed above on behalf of the content access device 620. Various configurations are possible and contemplated.

In various implementations, previous user behavior may be gathered, stored, processed, ranked, and used in a variety of ways to perform various of the techniques discussed above. Specific details about how previous user behavior may be gathered, stored, processed, ranked, and used in an example implementation will now be elaborated.

Data Gathering:

Whenever a user chooses to watch something, they are also essentially choosing not to watch many other things. This fact is significant. Modelling based on what a user chose to watch rather than also considering what they did not choose to watch may not be sufficient.

For example, a user may be observed to like watching sitcoms that are popular with young people. Another sitcom that is also popular with young people may be found and recommended. However, the user may hate a particular actor in that sitcom. As such the other sitcom may be repeatedly recommended without being picked by the other. Learning they did not pick this sitcom may allow learning not to keep recommending it.

By way of another example, a user may access a number of kids shows in a period of time. As such, additional kid shows may be recommended. However, the user may not access the additional recommended kid shows. It may be because the recommendations were provided at night time and the user only wants kid shows in the morning. This may be learned by recommending kid shows at night and noting that the user chose not to watch them. This may eventually establish a pattern.

However, at any given time, a user may have the option to watch hundreds of thousands of different instances of available. It may not be possible record and/or process everything a user chose not to watch. In some cases, the amount of data may be prohibitive. As such, data regarding choices a user did not make may be limited in some way.

In one particular example strategy, if a user accesses a home page such as the content navigation menu 100A and then accessed content from that, information about the content the user accessed and everything they didn't access on that home page may be recorded. Further, if the user accessed the home page for more than a few seconds and then accessed content from somewhere other than the home page, the content they accessed and everything on the home page they didn't access may be recorded. The data passed up and stored may be a small amount of metadata about their scenario.

For example, data passed up and recorded may include: what it was (catalog identifiers for content, parent, channel, host, and so on), what device they were using, time and/or date, access method (such as DVR, live, on demand, and so on), Who they are, and/or other circumstances that may not easily reconstructed (such as the fact it was during the premier when the user watched show X). This data may stored, such as in a data warehouse, and archived in a way that they may be retrieved and aggregated easily.

Metadata and Circumstance Tagging:

Input to processing, ranking, and other algorithms may need to be provided that will allow extreme flexibility in recognizing user behavior patterns. In order to do this, different metadata may be flattened into tags. This data may then be easily fed into other algorithms. This data may be broken up into What, Who, When, Where, Why, How categories.

What: "What" may describe the content itself. For example, "What" tagging may include tags that indicate that the tag relates to a type of content. A tag relating to a type of the content may identify that it is a type tag and include a sub field identifying the type, such as movie, series, news, and/or any other type. Other examples may include tags that indicate that the tag relates to a genre that the content may be classified within. A tag relating to a genre of the content may identify that it is a genre tag and include a sub field identifying the type, such as action, adventure, romance, and/or any other genre. Still other examples may include tags that indicate that the tag relates to the content being free content (or various kinds of pay content). A tag relating to the content being free may identify that it is a free tag and include a sub field identifying the source of the free content. Yet other examples may include tags that indicate that the tag relates to a length of the content. A tag relating to a length of the content may identify that it is a length tag and include a sub field identifying the length, such as about 15 minutes, about 30 minutes, about 60 minutes, about 120 minutes, over 120 minutes, and/or any other length. Other examples may include tags that indicate that the tag relates to a rating or rating group. A tag relating to a rating or a rating group of the content may identify that it is a rating or rating group tag and include a sub field identifying the rating or rating group, such as R, TV MA, TV 14, safe for kids, meant for adults, and/or any other rating or rating group. Additional examples may include tags that indicate that the tag relates to awards content may have won, been nominated for, and/or otherwise been involved with. A tag relating to awards may identify that it is an award tag and include a sub field identifying the award or other information, such as Oscar, Oscar best picture, Oscar best actor, and/or any other award information. Still other examples may include tags that indicate that the tag relates to a release of the content. A tag relating to a release of the content may identify that it is a release tag and include a sub field identifying the release information, such as released this year, released within 30 days, and/or any other release information. Other examples may include tags that indicate that the tag relates to an event relating to the content. A tag relating to an event relating to the content may identify that it is an event tag and include a sub field identifying the event, such as a season premier, live transmission, rerun, and/or any other event. Yet other examples may include tags that indicate that the tag relates to keywords associated with the content. A tag relating to a keyword associate with the content may identify that it is a keyword tag and include a sub field identifying the keyword, such as magic, family, and/or any other keyword. Other examples may include tags that indicate that the tag relates to a lead role of the content. A tag relating to a lead role of the content may identify that it is a lead role tag and include a sub field identifying information about the lead role, such as a female is in the lead role, a teenager is in the lead role, the lead role is in the news, and/or any other lead role information. Still other examples may include tags that indicate that the tag relates to a studio that produced the content. A tag relating to a studio that produced the content may identify that it is a studio tag and include a sub field identifying the studio. Other tags may identify other information describing the content, such as that the content is the most recent episode of a series.

Some examples of "What" tagging may include:
type.movie, type.series, type.news
genre.action, genre.adventure, genre.romance
free
free.nettflix
free.amazonn
length.about15 min, length.about30 min, length.about60 min, length.about120 min, length.over120 min
rating.r, rating.pg, rating.tvma, rating.tv14
ratinggroup.safe_for_kids, ratinggroup.meant_for_adults (example, "tv-ma" and "R" may different rating systems but may indicate similar content)
award.oscarr, award.oscarr.best_picture, award.oscarr.best_actor
released.this_year, released.within_30_days
event.season_premier, event.live, event.rerun
keyword.magic, keyword.family
lead_role.female, lead_role.teenager, lead_role.in_the_news
studio.marvell, studio.bad_robot
most_recent_episode Additionally, "What" may also include unique tags with identifiers. These may include identification of any aspect of the content and an identifier that indicates the specific item associated with the aspect for the content. This may include a specific identifier for a series, a director, an actor, a franchise, and/or any other aspect for which a specific item for that aspect may be associated with the content. Examples of such unique tags with identifiers:
series_id.435344
director_id.23694
actor_id.32523
franchise_id.4643

Who: "Who" may describe who the user of the content access device is. These may describe the user of the content in various ways. This may include a user identifier, an account identifier, a gender identifier, an age group identifier, a region identifier, and so on. Tags may include one or more sub fields specifying various information about the particular identifier (such as a particular age group for an age group identifier tag). Some examples may include:
user_id.3532
account_id.64346
gender.male
agegroup.adult
region.us
region.us_west
region.us_texas
region.us_texas_houston When: "When" describes when the user accessed the respective content. Access time may be indicated in a number of different ways. These may include a specific hour, a portion of the day, a day of the week, a type of the day such as a weekday or a weekend, a season, a month, a relationship to an occupation or activity such as whether or not school is in session or people are on vacation, and so on. Some examples may be:
time_7pm
time_evening
day_Wednesday
day_weekday
season_summer
month_june
school_is_out
common_vacation_week Where: "Where" may describe the location of the content access device. Access location may be described in a variety of ways. These may include a type of the content access device (such as a device type tag with a sub field indicating the device is a device such as a tablet, set top box, and so on), the network used to access, a room of the house in which access occurs, a network identifier used to access such as an internet protocol address, a geolocation specification, a type of location (such as a home, business, airport, and so on), and/or any other tag that describes access location in any way. Some examples may include:
devtype.tablet, devtype.stb
network.home, network.roaming
room.bedroom, room.kitchen
ip.23_55_34
geolocation.72N_48E
locationtype.airport Why: "Why" may include reasons a user might access content. Tags related to reasons why a user might access content might indicate that the content was recommended to the user and who it was recommended by, the content was popular and who it was popular with, and so on. Some examples include:
recommended_by.friends
popular.overall
popular.adult_males How: "How" may include how the user accessed the content. For example, tags may be a source tag. A source tag may have a sub field that indicates the particular source. Sources may include that the content was accessed as linear broadcast content, as a digital video recording, on demand (which may include further subfields specifying the provider of the on demand content or other such information), and so on. Some examples may include:

source.linear
source.dvr
source.on_demand
source.on_demand.layer3
source.on_demand.netflixx The above may be broken down into two major categories, metadata and circumstances. Metadata may be everything associated with content ("What", "Why", "How"). Circumstances may be everything associated with the user's situation ("Where", "When", "Who"). These two categories will be discussed further below.

Heuristic & Algorithmic Tagging:

Many tags may be applied without significant additional processing. For example, if a movie is classified in the "action" genre, it may be tagged "genre.action". Not all tags may be that basic, though. Some tag generator concepts may involve additional processing.

One such example may include series serial behavior tags. For series serial behavior tags, an algorithm can look at a user's history and determine a useful pieces of knowledge about the users habits. These may include: does the user watch this series in perfect order, or do they jump around; do they watch the most recent episode, or the next episode; if the user watches serially, what's the next episode; and so on. These pieces of metadata may be marked with tags stating these things. This may or may not help establish a pattern.

Another example may include a binge watch algorithm tags. This may involve: is the user binge watching the series (they've watched a lot of past episodes recently); if so, how fast?(casual, time wasting binge, or seriously trying to finish them all); can a user binge watch the series (are a lot of past episodes available); and so on.

Yet another example may include time routine tags. This may involve: what time does the user fall asleep, what time does the user get up, what time does the user go to work/school, what time does the user get out, and so on. This may be significantly useful for tagging windows of time like "timeblock.after_work", "timeblock.before_bed", "timeblock.before_school", and so on.

Still another example may include tags related to whether or not content was finished. This may involve detection of whether or not the content access device assumes the user finished something or not. It may not simply mean "did they hit stop halfway through", although that may be performed as a simple implementation case. This may also tie into the time routine tagger above. For example: did the user watch a movie all the way through the credits . . . then leave the TV on playing nothing for half an hour; did the user watch an episode on linear TV—then keep watching on the same channel something did the user doesn't normally watch; did this happen at the same time of day the user usually falls asleep; if this occurred the same time the user normally falls asleep and play extended beyond the end assume they fell asleep watching; and so on.

In yet another example, vacations and schedule aberration tags may be used. Schedule aberrations may change user patterns dramatically. For example, when a user goes on vacation, their viewing habits may change. When a user comes back from vacation, their viewing habits may also change. Detecting these events may be possible through geolocation changes, through long periods of unexpected inactivity, and so on. This may be useful in detecting various useful things, and generating useful tags to help accuracy. For example, a user usually watches a show within two days of something being recorded but when on vacation, they miss it. However, they'll likely watch that show within two days of getting back from vacation.

Combination Counting, Rule Inference, Directed Learning:

Once a large database of user history is accumulated, combinations of tag occurrences may be counted. The algorithm may start off counting occurrences of single tags. For example, counting occurrences of single tags in a particular implementation may yield:

type.series: 97
type.movie: 12
genre.kids: 34
genre.action: 45
time.7pm: 44
time.evening: 55
room.living_room: 23
room.kitchen: 13
room.bedroom: 55

Next, combinations that occur may be counted. For example, counting of combinations in a particular implementation may yield:

type.series+genre.kids: 18
type.series+genre.action: 34
type.series+time.7pm: 22
type.series+time.evening: 34
type.series+room.living_room: 21
type.series+room.kitchen: 17
type.series+room.bedroom: 43

Then longer combinations may be counted, and so on. For example, counting of longer combinations in a particular implementation may yield:

type.series+genre_kids+time.7pm: 5
type.series+genre_kids.time_evening: 3

The basis may be in conditional probability of dependent variables. For example, the probability that a user will watch a movie given that the user is in their bedroom may be stated as P(movie|bedroom). Conditional probability rule thus states that P(movie|bedroom)=P(movie,bedroom)|P(bedroom) and Bayes theorem states that P(movie|bedroom)=P(bedroom|movie)*P(movie)/P(bedroom). For independent variables, P(A,B)=P(A)*P(B). However, some variables are dependent. Thus, it may be useful to determine which variables are dependent.

For example, assume the following example facts: a user watches only movies in the bedroom, the user watches, only non-movies outside the bedroom, the probability that the user is going to watch a movie ever is 10%, the probability that the user is going to be in their bedroom is 30%. Attempting to calculate the probability that the user watches a movie and is in their bedroom by multiplying yields a result of 3%, which is 10%*30%. However, this is incorrect. If the user in this specific example is in their bedroom, they are always watching a movie. Thus, the chance that they are watching a movie and in their bedroom is still 30%. This may be the advantage of counting combinations, as that level of data may allow detection of dependent variables.

However, it may not be feasible to count all combinations. The number of combinations may be astronomically high. Combinations to count may be limited in various ways.

One example includes known implications from auto-generated rules. If a particular combination of tags would generate information that is already necessarily implied, rules may be generated not to combine those tags. For example, a time tagger may tag:

if (time>6:55 pm and time<7:55 pm) add tag "time.7pm"
if (time>5:55 pm and time<9:55 pm) add tag "time.evening"

In this particular implementation, "time.7pm" may imply "time.evening". While it may be useful count the combinations "type.movie+time.7pm" and "type.movie+time.evening", it may not be useful count this combination "type.movie+time.7pm+time.evening" because 7 pm already implies evening and this count may be exactly the same as "type.movie+time.7pm". Additionally, other rules may be known. For example, "evening→NOT morning" and "morning→NOT evening". From these, various do-not-combine rules may be generated.

Another example includes auto-learned implications from metadata. For example, analysis of tags may indicate one tag may strongly imply the other, but the reverse may not be the case. As the first may strongly imply the second, combinations of the two may not yield much useful information. As such, a rule indicating not to combine those first and second tags may be generated. For example in a particular implementation, the following basic counts may be obtained from a metadata set:

"series.game_of_thronnes": 112 episodes
"rating.tv_ma": 34253 episodes
"series.game_of_thronnes+rating.tv_ma": 111 episodes The following conditional probabilities may then be counted:

P(rating.tv_ma|series.game_of_thronnes)=count(series.game_of_thronnes+rating.tv_ma)/count(series.game_of_thronnes)=99%
P(series.game_of_thronnes|rating.tv_ma)=count(series.game_of_thronnes+rating.tv_ma)/count(rating.tv_ma)= 0.3%

This may indicate that Game of Thronnes very strongly implies TV-MA, but TV-MA does not necessarily imply Game of Thronnes. However, because one implies the other, further combinations of them may not need to be counted. For example, it has already been determined "time.7pm+rating.tv_ma": 354 and "time.7pm+series.game_of_thronnes": 33, then it would be redundant to count the combination "time.7pm+rating.tv_ma+series.game_of_thronnes" because it is already known Game of Thronnes strongly implies TV-MA. As such, it can be assumed that the count would be about 32-33 it would be redundant to count and/or store that metadata.

Additionally, since it is already known that "Game of Thronnes→TV-MA" then it is already also known with confidence that "NOT TV-MA→NOT Game of Thronnes". As such, a large amount of other combinations may be eliminated.

Yet another example includes disallowed combinations. Some combinations of tags could not possibly occur. As such, combinations of those tags may not be looked for. For example, certain tags may be identifiers. For example: "series.game_of_thronnes", "series.house", or "series.lost". The combination "series.house+series.lost" could not possible occur, so counting that combination may be omitted. In various implementations, tags may be more like "series.354634" rather than "series.house", but that may not change the principle of operation.

It may also be determined that other combinations of tags do not yield useful information and so rules may be generated not to count combinations of those tags. For example, identifier-type tags may be further used, such as tags like actor.tom_hanks, actor.meg_ryan, and actor.samuel_l_jackson. While it is certainly possible for two actors two be in a movie together, calculating multiple combinations of actors produces an astronomical number of combinations that may not necessarily be valuable for rule generation. As such, counting such combinations may be omitted.

Still another example includes combination size limiting. Making all possible combinations may yield an astronomical number. Limiting size of combinations to a small number, such as 2, 3, or 4, may be sufficient for pattern-generation purposes. More factors may cause the patterns become incredibly complex, and the likelihood of the incredibly complex patterns providing any value may drop dramatically. The confidence that the value will drop as complexity increases may increase as the situation gets increasingly more specific.

Decay and Scoring:

User's habits may change over time. Determining and incorporating those changes in behavior into ranking algorithms may allow them to remain accurate. For example, scores may be assigned that are weighted more heavily when recent, declining in various ways over time.

In one example, a "weighted count" may be calculated based on recency. It might include calculating: <2 weeks: 1 point, <6 weeks: 0.8 points, <20 weeks: 0.5 points, <52 weeks: 0.3 points, <104 weeks: 0.1 points (in other implementations it may be a smooth curve rather than a series of points). This may count events the user watched and events the user did not watch. Events a user did not watch may be scored 0. When circumstance counting is done, for each combination of tags, the following four metrics may be counted: total possible count, total weighted count of watch events, total possible weighted count, and total weighted count of watch events. Assume the following example events:

7pm,bedroom,series,game_of_thronnes (1 week ago, watched)
7pm,bedroom,series,house (1 weeks ago, did not watch)
7pm,bedroom,series,lost (3 weeks ago, watch)
7pm,bedroom,series,game_of_thronnes(3 week ago, did not watch)

The following may then be calculated:
series:
total possible count: 4
total watch count: 2
total possible weighted count: 1+1+0.8+0.8=3.6
total weighted count: 1+0.8=1.8
game of thrones
total possible count: 2
total watch count: 1
total possible weighted count: 1+0.8
total weighted count: 1

When statistical certainty is counted (discussed below), these weighted scores may be useful.

Although a specific example is listed herein, it is understood that it is an example. Various methods of scoring and score decay may be used to account for user behavior changes over time.

Directed Learning and Time-Limited Calculation:

The above discuses counting combinations of events happening. That may be a massive number of counts to perform on a large amount of data. It may not be possible to count all combinations. As such, various strategies may be performed to reduce the amount of counting performed. For example, time-boxing may be used.

By way of illustration, each user may be allocated a particular amount of CPU time for calculating user behavior data per day, such as 20 seconds. During that time, as much data may be calculated as possible about the user. The results may be stored in a database for lookup later. For example, if CPU time was limited to 20 seconds for each user per day, and each server performing such processing has 8 CPUs, and there are 86400 seconds per day, one server may calculate 34560 users worth of user behavior data per day.

Furthermore, optimizations may be made. In some cases, data may be calculated more often for users that have less previously calculated data. For example, for users that have 10 events in their history, the 11th piece of data may be valuable and a lot may be learned from it. As such, data for such users may be calculated more often. By way of another example, for users that have 10000 events in their history, the 10001st piece of data may not teach much. As such, data for such users may be calculated less often. Given that calculations for a user may not start from scratch each time, a model may be build that allows picking up where calculations previously left off.

By way of another example, directed learning may be used to reduce the amount of counting performed. In some cases, calculating combinations may be done first for content a user has accessed the most previously and thus may most likely access in future and may most likely yield significant data from analysis. For example, a user may have 200 series, 10 movies, and 3 specials in their history. In such a situation, calculating combinations of events may start by expanding combinations involving series. This may be done for at least two reasons. First, a series is more likely what the user will access and therefore it's more valuable to learn about that case. Second, learning about movies may teach less because the number of movies may not be significant enough to be statistically relevant. Thus the most useful information may be learned first.

Pattern Generation:

The next step may be to use the combinations that have been generated to detect patterns. The patterns may be pre-calculated, may generate them on the fly, and so on.

The patterns may start as single-probability statements such as P(movie)=10%, P(series)=80%, and so on and then grow to conditional probability statements such as P(movie|7pm), P(movie|evening), P(movie|action), P(movie|live), P(movie|dvr), P(movie|ondemand), and so on. The conditional probability statements may then grow to further expansions such as P(movie,actionl|7pm), P(movie|7pm, bedroom), P(movie,dvr|7pm), P(movie|7pm,dvr), and so on and even negatives such as: P(NOT movie|7pm), P(NOT movie|bedroom), P(NOT movie|7pm,bedroom). These may be calculated using the conditional probability rule P(AB-C|DEF)=P(ABCDEF)/P(DEF) since a large number of combination counts may be stored.

Some combinations may be unknown. That may be acceptable. As much as is possible may have been learned. And, since directed learning was used, the most useful patterns may have been discovered first.

The following reduction may be useful to make calculation simpler:

P(ABCDEF)=count(ABCDEF)/count(all)
P(ABC)=count(ABC)/count(all)
P(ABCDEF)/P(DEF)=(count(ABCDEF)/count(all))/(count(ABC)/count(all))=count(ABCDEF)/count(ABC)

The following are some example patterns for calculating counts:

count(all) may be calculated and stored
count(A) may be calculated and stored so that it can be looked up directly
count(A,B,C) may be calculated and stored so that it can be looked up directly
count(!A)=count(all)−count(A)
count(!A,B,C)=count(B,C)−count(A,B,C)

The net result of this step may be a large number of patterns and at least a rough idea of how reliable every one of those patterns is. For example, one or more of the following examples may be determined in various example implementations:

(anytime)→series: 90%
(anytime)→movie: 10%
(anytime)→game of thronnes: 20%
series→drama: 50%
series→tv-ma: 60%
series→game of thronnes: 30%
evening→game of thronnes: 20%
evening→series: 80%
game of thronnes→evening: 100%
NOT evening→NOT game of thronnes: 100%
series, evening→game of thronnes: 50%

Candidate Selection:

At any given time, a user may choose to watch hundreds of thousands of different instances of content. In some cases, content access device and/or related systems may have a difficult time processing that much data on the fly for every user. It may be desirable to limit the amount of processing.

As such, various content that may be more likely than others for various reasons may be made the focus of the above processing in order to limit the amount of processing that may be performed. In an example implementation of the above, processing may include the most recent episode of a series the user has watched before, the next episode of a series the user has watched before, the last-watched episode of a series the user has watched before, anything that's being aired at the time, anything that's on the user's DVR, a selection of popular movies and TV shows among the general public, and apps the user has. This example implementation may cut down the list of content that may appear in the results. For example, this example implementation could cut down results from 100,000s to 1000-2000. Such a number may be more manageable.

The Pattern Path:

Once a list of possible content is obtained, ranking may then be performed. The following is an example implementation of such a ranking procedure.

Step 1: Figure out the current circumstances. The current circumstances may be a set of conditions that apply to the user right then. This may use the above tagging methods, but applies them to the user's current situation. For example, this may be specified as "7pm,evening,livingroom,tablet". It should be understood that this is a simplified example and a great deal more information may be included.

Step 2: Start a list of known facts. This may start as the list of circumstances.

Step 3: Figure out all patterns that may apply. Anything dependent on any subset of the list of known facts may be an applicable rule. For example, an example implementation may determine that the following patterns are applicable:

(anytime)→series: 90%
(anytime)→movie: 10%
evening→series: 85%
evening→movie: 15%
evening→NOT game_of_thronnes: 100%
evening→NOT kids: 100%
livingroom→series: 92%
livingroom→movie: 8%
tablet→kids: 54% tablet→!game_of_thronnes: 54%
7pm,evening→series: 88%
evening,livingroom→series: 84%

Step 4: Pick the most reliable pattern and add its results to the list of known facts. If rules are 100% reliable multiple rules may be added at a time. In the above examples, the most reliable rule may be "NOT game_of_thronnes", which may thus be added. The list may then become "7pm,evening, livingroom,tablet,!game_of_thronnes".

Step 5: Filter the list of possible content by the metadata rules that are applied in the list of known facts. For example, if the known fact set includes "series", filter out anything that's not a series. By way of another example, if the list of known facts includes "!game_of_thronnes", anything that's game of thrones may be filtered out.

If there is no content left that matches the list of known facts, pop the last learned fact off, back up, and pick the NEXT most reliable rule after the one previously picked. If a single piece of content left is left, the first ranking may be determined and it may be placed on the list. However, if there is more content, return to step 3 and continue applying the most reliable pattern to the list of facts.

Returning to step 3 may involve new knowledge and thus new rules that may apply. For example, "series" may have been added to the list of known facts. New rules may then be accessed that were previously unavailable, such as series-→drama: 80% and/or series→kids: 20%.

All possible available patterns may be applied without getting down to a single piece of content. If so, add all the content left into the rankings. As such, they may all considered likely.

Reliability Modifiers: Certainty, Recency, Demographic Patterns:

Pattern reliability and combination counting and choosing the "most reliable" pattern were all discussed above. Those concepts will all now be further elaborated. With regards to statistical certainty in a particular example, the following combinations may be obtained:

series: 60
movie: 4
evening: 64
7pm: 61
8pm: 3
series+evening: 60
series+7pm: 60
series+8pm: 0
movie+evening: 4
movie+7pm: 1
movie+8pm: 3

The following in the example may therefore be learned based on the above:

P(series)=60/64=93%
P(movie)=4/64=6%
P(series|evening)=60/64=93%
P(series|7pm)=60/64=93%
P(series|8pm)=0/64=0%
P(movie|evening)=4/64=6%
P(movie|7pm)=1/60=2%
P(movie|8pm)=3/3=100%

From the above, there may be a stand-out pattern. At 8 pm in this example, the user is 100% likely to watch a movie. Further, the user has only ever watched something at 8 pm only 3 times, and 3 times may not be particularly significant.

Statistical certainty suggests that the more occurrences a situation has, the more that pattern is trustworthy. In this example, if a user turned on their TV at 8 pm, the P(movie|8pm) may be examined. A pattern may be recognized, but it may not be particularly trustworthy due to its infrequency. As such, it may not be treated as the most reliable pattern.

Additionally, the recency calculations above may be applied to affect reliability. Patterns that are newer may be considered more reliable.

Further, ranking patterns may be generated not just for one user, but for bulk users. For example, patterns/rankings may be calculated for 1 user, all users in an account, all users in a region, all users in a demographic, all users globally, and so on. Patterns not directly applicable to a user may be considered less reliable than patterns derived from the user's own data. However, they may not be ignored and may have some value. For brand new users with no viewing history, bulk user patterns/ranking be the most reliable calculations available.

A reliability score may be determined by combining how often the pattern applies (base probability), how statistically certain the pattern is, how recent the pattern is, and how broad the pattern is. Combining those four numbers together may yield a final reliability score that can then be used when determining the "most reliable" pattern.

Slot Limiting:

The above mentioned a pattern where P(movie|8pm) is 100%, but it only ever happened 3 times. As such, the statistical certainty regarding the pattern may be very low. One way of dealing with this is dropping the reliability score. Another is to slot-limit the results applied by the pattern as the most reliable patterns are evaluated. This may involve limiting the amount of use that is made of patterns where statistical certainty is low.

For example, P(movie|8pm) may be 100%, but it may not be statistically certain because it only happened 3 times. Thus, 'movie' may be added the list of known facts, but results may be limited to 3 slots. Once those are filled, the 'movie' fact may be removed and the next most reliable pattern may be picked.

This slot limiting technique may be used in other calculations above, not just in situations involving statistical uncertainty. For example, if any a pattern is 50% reliable, that pattern may be added, but it may only be allocated up to approximately 50% of remaining slots.

Recommendation System Fallback:

The above focuses on picking out patterns. However, in some cases, patterns may only go so far. Patterns may only be so complex without overfitting. For example, the above implementation could indicate that a user is very likely to watch a movie with genre "action" that is at least 120 minutes long and rated R. There may be literally thousands of movies that fit that description. As such, other recommendation algorithms may take over. From the movie results, the best ones may be picked based on other factors. Such other factors may include popularity, collaborative filtering, box office take, recency, and the like.

As described above and illustrated in the accompanying figures, the present disclosure relates to content access/ navigation menus that are influenced by previous user-behaviors. Content that is available to be accessed using a content access device is ranked based at least on recorded or other previous user behavior information regarding content selection as compared to a current situation (such as the current situation of the content access device). A content navigation (or access) menu is generated and presented that indicates content selected based on the ranking. The ranking, generation, and/or presentation may be performed upon a determination to present the content navigation menu, such as when the content access device first operates, upon receipt of a user request for such a menu, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A content access device, comprising:
a non-transitory storage medium storing instructions; and
a processing unit that executes the instructions to present a content navigation menu by:
identifying a set of metadata tags that applies to a current situation of the content access device;
using the set of metadata tags to ascertain applicable patterns in information regarding previous user behavior, the information regarding the previous user behavior including patterns generated by counting first combinations of metadata tags that occur together and that conditional probability calculations indicate do not imply each other and eliminating second combinations of the metadata tags that occur together and that the conditional probability calculations indicate imply each other;
selecting a group of patterns from the applicable patterns;
ranking available content for a user using the group of patterns;
presenting a primary menu element corresponding to a highest of the available content;
presenting a secondary menu element corresponding to a secondary ranked group of the available content; and
presenting a tertiary menu element corresponding to a tertiary ranked group of the available content.

2. The content access device of claim 1, wherein:
secondary menu element areas for the secondary ranked group of the available content are each smaller than an area of the primary menu element for the highest of the available content; and
tertiary menu element areas for the tertiary ranked group of the available content are each smaller than each of the secondary menu element areas.

3. The content access device of claim 1, wherein the highest of the available content is presented in the primary menu element.

4. The content access device of claim 1, wherein still images from the secondary ranked group of the available content are presented in the secondary menu element.

5. The content access device of claim 1, wherein text descriptions of the tertiary ranked group of the available content are presented in the tertiary menu element.

6. The content access device of claim 1, wherein the processing unit switches from the content navigation menu to present selected content in response to a content selection.

7. The content access device of claim 6, wherein, in response to a selection to return from the selected content to the content navigation menu, the processing unit provides a modified content navigation menu where:
the primary menu element corresponds to the selected content; and
a secondary menu element area corresponding to the highest of the available content replaces a previous secondary menu element area.

8. A method for facilitating content navigation using a content access device, comprising:
recording user behavior information regarding selection by a user of content using the content access device and a situation of the content access device at a time of access by:
flattening metadata into metadata tags; and
generating patterns based on counting first combinations of the metadata tags that occur together and that conditional probability calculations indicate do not imply each other and eliminating second combinations of the metadata tags that occur together and that the conditional probability calculations indicate imply each other;
determining to present a content access menu using the content access device;
identifying a set of metadata tags from the metadata tags that applies to a current situation of the content access device;
using the set of metadata tags to ascertain applicable patterns of patterns in the user behavior information;
selecting a group of patterns from the applicable patterns;
ranking available content using the group of patterns; and
presenting the content access menu indicating content selected based on the ranking utilizing the content access device.

9. The method of claim 8, wherein the current situation of the content access device includes at least one of a current time period, a date, a location, or a time of year.

10. The method of claim 8, wherein ranking the available content based on the user behavior information compared to the current situation of the content access device includes ranking an instance of content lower if the instance of content is relevant to a particular time period that is not associated with a current time period.

11. The method of claim 8, wherein the user behavior information indicates an instance of content the user is most likely to access in context of the current situation of the content access device.

12. The method of claim 8, further comprising presenting an additional content access menu indicating content selected based on the ranking utilizing the content access device wherein the additional content access menu has a different arrangement than the content access menu.

13. The method of claim 8, wherein presenting the content access menu is performed when the content access device begins operation.

14. The method of claim 8, further comprising:
switching the content access device to a profile associated with an additional user;
re-ranking the available content utilizing the content access device based on user behavior information of the additional user compared to the current situation of the content access device; and
presenting an additional content access menu based on the re-ranking utilizing the content access device.

15. A content access device, comprising:
a non-transitory storage medium storing instructions; and
a processing unit that executes the instructions to:
determine to present a content access menu;
identify a set of metadata tags that applies to a current situation of the content access device;
use the set of metadata tags to ascertain applicable patterns in recorded user behavior information regarding selection of content by a user and a situation at a time of access, the information regarding the recorded user behavior information including patterns generated by counting first combinations of metadata tags that occur together and that conditional probability calculations indicate do not imply each other and eliminating second combinations of the metadata tags that occur together and that the conditional probability calculations indicate imply each other;
select a group of patterns from the applicable patterns;
rank available content using the group of patterns; and
present the content access menu indicating content selected based on the ranking.

16. The content access device of claim 15, wherein a first portion of the content access menu corresponding to a higher ranked content is larger than a second portion of the content access menu corresponding to a lower ranked content.

17. The content access device of claim 16, wherein a third portion of the content access menu corresponding to an instance of content ranked lower than the lower ranked content is smaller than the second portion of the content access menu.

18. The content access device of claim 15, wherein the content access menu comprises a list of content descriptions.

19. The content access device of claim 15, wherein the processing unit presents an instance of content in response to a selection from the content access menu.

20. The content access device of claim 15, wherein the recorded user behavior information includes data regarding content selected by the user using a different content access device.

* * * * *